US010776419B2

(12) United States Patent
Defouw et al.

(10) Patent No.: US 10,776,419 B2
(45) Date of Patent: Sep. 15, 2020

(54) AUDIO FILE QUALITY AND ACCURACY ASSESSMENT

(71) Applicant: Gracenote Digital Ventures, LLC, New York, NY (US)

(72) Inventors: Gregory P. Defouw, Redwood City, CA (US); Venkatarama Anilkumar Panguluri, Milpitas, CA (US)

(73) Assignee: GRACENOTE DIGITAL VENTURES, LLC, New York, NY (US)

( * ) Notice: Subject to any disclaimer, the term of this patent is extended or adjusted under 35 U.S.C. 154(b) by 149 days.

(21) Appl. No.: 14/280,259

(22) Filed: May 16, 2014

(65) Prior Publication Data

US 2015/0331941 A1 Nov. 19, 2015

(51) Int. Cl.

| G06F 16/61 | (2019.01) |
| G06F 3/16 | (2006.01) |
| G10L 25/69 | (2013.01) |
| H04N 21/84 | (2011.01) |
| H04N 21/81 | (2011.01) |
| G10L 25/51 | (2013.01) |
| H04N 21/233 | (2011.01) |
| H04N 21/258 | (2011.01) |
| H04N 21/262 | (2011.01) |

(Continued)

(52) U.S. Cl.
CPC .............. G06F 16/61 (2019.01); G06F 3/165 (2013.01); G10L 25/51 (2013.01); G10L 25/69 (2013.01); H04N 21/233 (2013.01); H04N 21/25891 (2013.01); H04N 21/26258 (2013.01); H04N 21/8106 (2013.01); H04N 21/84 (2013.01); *G10L 15/26* (2013.01); *G10L 25/03* (2013.01)

(58) Field of Classification Search
CPC ......... G06F 17/30796; G06F 17/30026; G06F 17/30778; G06F 16/61; G06F 3/165
USPC ......... 707/687, 916, 917; 704/687, 916, 917
See application file for complete search history.

(56) References Cited

U.S. PATENT DOCUMENTS 4,882,757 A * 11/1989 Fisher ................... G10L 15/193
704/253
5,479,490 A * 12/1995 Nakashima ........... H04M 1/652
379/74

(Continued)

FOREIGN PATENT DOCUMENTS

EP 2261893 12/2010

OTHER PUBLICATIONS

International Search Report and Written Opinion dated Mar. 26, 2015 in PCT/US2014/072641 (10 pages).

(Continued)

*Primary Examiner* — Pierre M Vital
*Assistant Examiner* — Nargis Sultana
(74) *Attorney, Agent, or Firm* — McDonnell Boehnen Hulbert & Berghoff LLP

(57) ABSTRACT

Disclosed computer-based systems and methods for analyzing a plurality of audio files corresponding to text-based news stories and received from a plurality of audio file creators are configured to (i) compare quality and/or accuracy metrics of individual audio files against corresponding quality and/or accuracy thresholds, and (ii) based on the comparison: (a) accept audio files meeting the quality and/or accuracy thresholds for distribution to a plurality of subscribers for playback, (b) reject audio files failing to meet one or more certain quality and/or accuracy thresholds, (c) remediate audio files failing to meet certain quality thresholds, and (d) designate for human review, audio files failing to meet one or more certain quality and/or accuracy thresholds by a predetermined margin.

18 Claims, 5 Drawing Sheets

(51) Int. Cl.
*G10L 25/03* (2013.01)
*G10L 15/26* (2006.01)

(56) References Cited

U.S. PATENT DOCUMENTS

| | | | | |
|---|---|---|---|---|
| 5,649,060 | A * | 7/1997 | Ellozy | G06F 17/30746 704/278 |
| 5,721,827 | A * | 2/1998 | Logan | G06Q 30/04 709/217 |
| 6,009,392 | A * | 12/1999 | Kanevsky | G10L 15/063 704/240 |
| 6,263,308 | B1 * | 7/2001 | Heckerman | G10L 15/063 704/231 |
| 6,345,252 | B1 * | 2/2002 | Beigi | G10L 15/26 704/272 |
| 6,741,724 | B1 * | 5/2004 | Bruce | G06Q 10/10 382/101 |
| 7,565,104 | B1 * | 7/2009 | Brown | H04H 60/72 455/3.01 |
| 7,613,731 | B1 * | 11/2009 | Larson | G06F 40/106 |
| 7,873,424 | B1 * | 1/2011 | Goeppner | H04R 5/02 381/18 |
| 8,688,445 | B2 * | 4/2014 | Chang | G10L 15/34 704/235 |
| 9,002,703 | B1 * | 4/2015 | Crosley | G06Q 10/101 704/206 |
| 9,111,534 | B1 * | 8/2015 | Sylvester | G10L 13/00 |
| 9,165,556 | B1 * | 10/2015 | Sugar | G10L 15/10 |
| 2001/0014891 | A1 * | 8/2001 | Hoffert | G06F 17/30017 |
| 2002/0010916 | A1 * | 1/2002 | Thong | H04N 5/278 725/1 |
| 2002/0099552 | A1 * | 7/2002 | Rubin | G09F 27/00 704/270 |
| 2003/0225578 | A1 * | 12/2003 | Kahn | G10L 15/26 704/243 |
| 2004/0049385 | A1 * | 3/2004 | Lovance | G10L 15/063 704/235 |
| 2004/0059740 | A1 * | 3/2004 | Hanakawa | G06F 16/93 |
| 2004/0215665 | A1 * | 10/2004 | Edgar | H04L 63/08 |
| 2004/0254792 | A1 * | 12/2004 | Busayapongchai | H04M 3/4938 704/260 |
| 2005/0080625 | A1 * | 4/2005 | Bennett | G06F 16/24522 704/249 |
| 2005/0080633 | A1 * | 4/2005 | Lueck | G10L 15/22 704/278 |
| 2005/0182675 | A1 * | 8/2005 | Huettner | H04L 69/329 705/14.56 |
| 2006/0217966 | A1 * | 9/2006 | Hu | G06F 16/683 704/200 |
| 2006/0294453 | A1 * | 12/2006 | Hirata | G10L 15/26 715/203 |
| 2007/0055514 | A1 * | 3/2007 | Beattie | G10L 15/08 704/235 |
| 2007/0172805 | A1 * | 7/2007 | Paul | G09B 5/00 434/308 |
| 2007/0192309 | A1 * | 8/2007 | Fischer | G06F 16/3344 |
| 2008/0005656 | A1 * | 1/2008 | Pang | G09B 5/062 715/203 |
| 2008/0022207 | A1 * | 1/2008 | Hsu | G11C 7/16 715/727 |
| 2008/0039010 | A1 * | 2/2008 | Vance | G06Q 30/02 455/3.06 |
| 2008/0140413 | A1 * | 6/2008 | Millman | G09B 7/02 704/270 |
| 2008/0177860 | A1 * | 7/2008 | Khedouri | G06F 16/64 709/217 |
| 2008/0215316 | A1 * | 9/2008 | Lewis | G06F 16/685 704/211 |
| 2008/0270437 | A1 * | 10/2008 | Kahn | G06F 17/30008 |
| 2009/0042178 | A1 * | 2/2009 | Bay | G09B 7/00 434/350 |
| 2009/0276215 | A1 * | 11/2009 | Hager | G10L 15/18 704/235 |
| 2010/0026815 | A1 * | 2/2010 | Yamamoto | G03B 17/00 348/207.1 |
| 2010/0100378 | A1 * | 4/2010 | Kroeker | G10L 15/22 704/235 |
| 2010/0217591 | A1 * | 8/2010 | Shpigel | G10L 15/32 704/235 |
| 2010/0235916 | A1 * | 9/2010 | Radatti | G06F 21/56 726/24 |
| 2010/0241963 | A1 * | 9/2010 | Kulis | G06F 16/64 715/727 |
| 2011/0035326 | A1 * | 2/2011 | Sholl | G06Q 10/0635 705/317 |
| 2011/0093343 | A1 * | 4/2011 | Hatami-Hanza | G06F 16/48 705/14.64 |
| 2011/0154391 | A1 * | 6/2011 | Velazquez | H04N 21/8106 725/33 |
| 2011/0246189 | A1 * | 10/2011 | Fox | G10L 25/78 704/210 |
| 2011/0288861 | A1 * | 11/2011 | Kurzweil | G09B 5/06 704/235 |
| 2011/0288862 | A1 * | 11/2011 | Todic | G10H 1/368 704/235 |
| 2012/0030236 | A1 * | 2/2012 | Burton, Jr. | G06Q 30/02 707/770 |
| 2012/0046948 | A1 * | 2/2012 | Leddy | G10L 13/06 704/260 |
| 2012/0089635 | A1 * | 4/2012 | Elchik | G06F 17/30669 707/769 |
| 2012/0144455 | A1 * | 6/2012 | Lazar | G06F 21/31 726/4 |
| 2012/0166180 | A1 * | 6/2012 | Au | G06F 40/253 704/9 |
| 2012/0175412 | A1 * | 7/2012 | Grabiner | G16H 15/00 235/375 |
| 2013/0054251 | A1 * | 2/2013 | Eppolito | G10L 21/0316 704/500 |
| 2013/0058471 | A1 * | 3/2013 | Garcia | H04M 3/42221 379/202.01 |
| 2013/0197902 | A1 * | 8/2013 | Nazarian | G10L 21/00 704/201 |
| 2014/0046659 | A1 * | 2/2014 | Burton | G10L 25/48 704/226 |
| 2014/0046662 | A1 * | 2/2014 | Tyagi | G10L 15/144 704/243 |
| 2014/0122079 | A1 * | 5/2014 | Kaszczuk | G10L 13/02 704/260 |
| 2014/0142954 | A1 * | 5/2014 | Cameron | G06F 3/165 704/276 |
| 2014/0156656 | A1 * | 6/2014 | Yen | H04L 67/02 707/736 |
| 2014/0189510 | A1 * | 7/2014 | Ozcan | G06F 3/0482 715/716 |
| 2014/0198923 | A1 * | 7/2014 | Miet | G10K 11/178 381/66 |
| 2014/0270524 | A1 * | 9/2014 | Diamond | G06Q 30/0201 382/170 |
| 2014/0278421 | A1 * | 9/2014 | Komissarchik | G10L 15/26 704/251 |
| 2014/0304303 | A1 * | 10/2014 | Dalal | G11B 27/36 707/797 |
| 2014/0341396 | A1 * | 11/2014 | Isberg | H03G 3/32 381/107 |
| 2014/0369527 | A1 * | 12/2014 | Baldwin | H03G 3/20 381/107 |
| 2015/0234635 | A1 * | 8/2015 | Beaumont | G06F 3/0485 704/275 |

OTHER PUBLICATIONS

International Search Report dated Dec. 1, 2016, issued in connection with PCT Application No. PCT/US2014/072641 (7 pages).

* cited by examiner

AUDIO FILE QUALITY AND ACCURACY ASSESSMENT

BACKGROUND

Unless otherwise indicated herein, the materials described in the background section are not prior art to the claims in this disclosure and are not admitted to be prior art by inclusion in this section.

Radio stations typically produce and broadcast audible content that is intended to appeal to a variety of different listeners. For example, a news anchor affiliated with the radio station may read aloud news stories from each of a variety of different predetermined categories, such as sports, entertainment, politics, weather, and national news.

Although some listeners may be interested in audible versions of news stories from all of the predetermined categories, other listeners may have different interests. For example, one listener may be interested in only sports and entertainment, while another listener may be interested in only politics and national news. In either case, the listener may be presented with audible content that does not align with his or her interests. As a result, the listener may find the news program unappealing.

One way to address this shortcoming of typical "one size fits most" radio station broadcasts is to implement a system configured to provide subscribers personalized audible news stories tailored to each subscriber's interests. In operation, such a personalized news system may be configured to generate and distribute personalized playlists of audio files comprising audible versions of news stories to subscribers for playback on the subscribers' computing devices, e.g., smartphones, tablets, laptops, desktops, and media players.

SUMMARY

The personalized news service contemplated herein preferably offers news stories in the form of audio files to subscribers in many and perhaps even hundreds of different categories and subcategories. For example, the broad category of politics may include multiple subcategories tailored to (i) national politics for the U.S. and perhaps multiple other countries, (ii) state politics for many different states, and (iii) local politics for many different cities and localities. Similarly, the broad category of sports may include subcategories tailored to (i) different types of sports, e.g., baseball, basketball, and hockey, (ii) different leagues or levels of competition (e.g., high school, college, and professional), and/or (iii) different teams in each sport in each league or level of competition. Other broad categories may have similarly tailored subcategories, e.g., business, finance, arts and entertainment, weather, health, and technology.

Additionally, some news stories are time sensitive and typically, as a news story gets older (measured in hours or sometimes days at most), it becomes less valuable or interesting to subscribers because the information may be out of date or subscribers may have heard the information from other news outlets already. Therefore, the collection of news stories available for distribution to subscribers is preferably updated constantly throughout the day to ensure that the individual news stories heard by subscribers are "newsworthy" (i.e., timely and not out of date).

Implementing a personalized news service configured to offer a wide variety of timely news stories in the form of audio files to a diverse subscriber base having wide and varied interests presents a number of technical challenges. One challenge lies in coordinating and managing the creation of the hundreds or perhaps even thousands of audio files corresponding to news stories that must be created throughout the day every day. One way to address this challenge is to hire, contract, or otherwise arrange for many different people to create audio files corresponding to the news stories. In operation, transcripts of news stories can be sent to individual audio file creators, and each audio file creator may use a computer equipped with a microphone and appropriate recording software to record him or herself reading the transcript of the news story into the microphone to generate an audible version of the news story as a computer-readable audio file. The audio file creator may then send or upload the audio file to a personalized news system.

However, distributing the audio file creation function across many different audio file creators presents a host of other challenges in terms of ensuring consistency among audio files created by different audio file creators using different hardware and software and generating recordings in different recording environments. From an operational perspective, it may be desirable for the audio files to have a consistent form and format to facilitate organization and predictable playback quality on a wide variety of third-party end-user devices, e.g., smart phones, tablets, and computers. Similarly, from a consumer perception standpoint, it may be desirable for the audio files to have a consistent level of quality in terms of sound and tone, e.g., consistent volume level, consistent words-per-minute pace, consistent reading style, consistent ambience (e.g., presence and background noise). Additionally, it may be desirable for each audio file to contain an accurate recitation of its corresponding news story, e.g., without errors, omissions, or misstatements (purposeful or otherwise). However, it may be impractical for a person or even a team of people to review every audio file for consistent quality and accuracy because of the large number of audio files uploaded to the personalized news system throughout the day each day.

The presently disclosed systems and methods help overcome the above-described challenges and other challenges involved with the distributed creation and centralized assessment and management of a large collection of audio files (e.g., audible versions of time-sensitive news stories) by implementing computer based systems and methods for analyzing the quality and/or accuracy of each audio file before the audio file is made available for distribution to subscribers for playback. In operation, an example method includes (i) receiving a plurality of audio files from a plurality of audio file creators, where individual audio files (of the plurality of audio files) correspond to text-based news stories, (ii) performing one or more computer-based analyses of the individual audio files, and (iii) comparing quality and/or accuracy metrics of individual audio files against corresponding quality and/or accuracy thresholds.

Then, based on the comparison(s), the example method further includes (i) accepting audio files meeting the quality and/or accuracy thresholds for distribution to a plurality of subscribers for playback, (ii) rejecting audio files failing to meet one or more certain quality and/or accuracy thresholds, (iii) remediating audio files failing to meet certain quality thresholds, and/or (d) designating for human review, audio files failing to meet one or more certain quality and/or accuracy thresholds by a predetermined margin.

As used herein, the term "subscriber" may mean any user, member, or listener who has signed up, registered, or otherwise indicated a desire to receive and/or listen to the audio files associated with the systems and methods implemented in connection with the personalized news service described herein, regardless of whether such user or listener has paid to receive and/or listen to the audio files.

DETAILED DESCRIPTION

The disclosed systems and methods are described herein with reference to the figures. It should be understood, however, that numerous variations from the depicted arrangements and functions are possible while remaining within the scope and spirit of the claims. For example, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For example, one or more processors may execute one or more sets of programing instructions and/or computer algorithms as at least part of carrying out of one or more of the functions described herein.

I. Example Computing System

Figure 1:
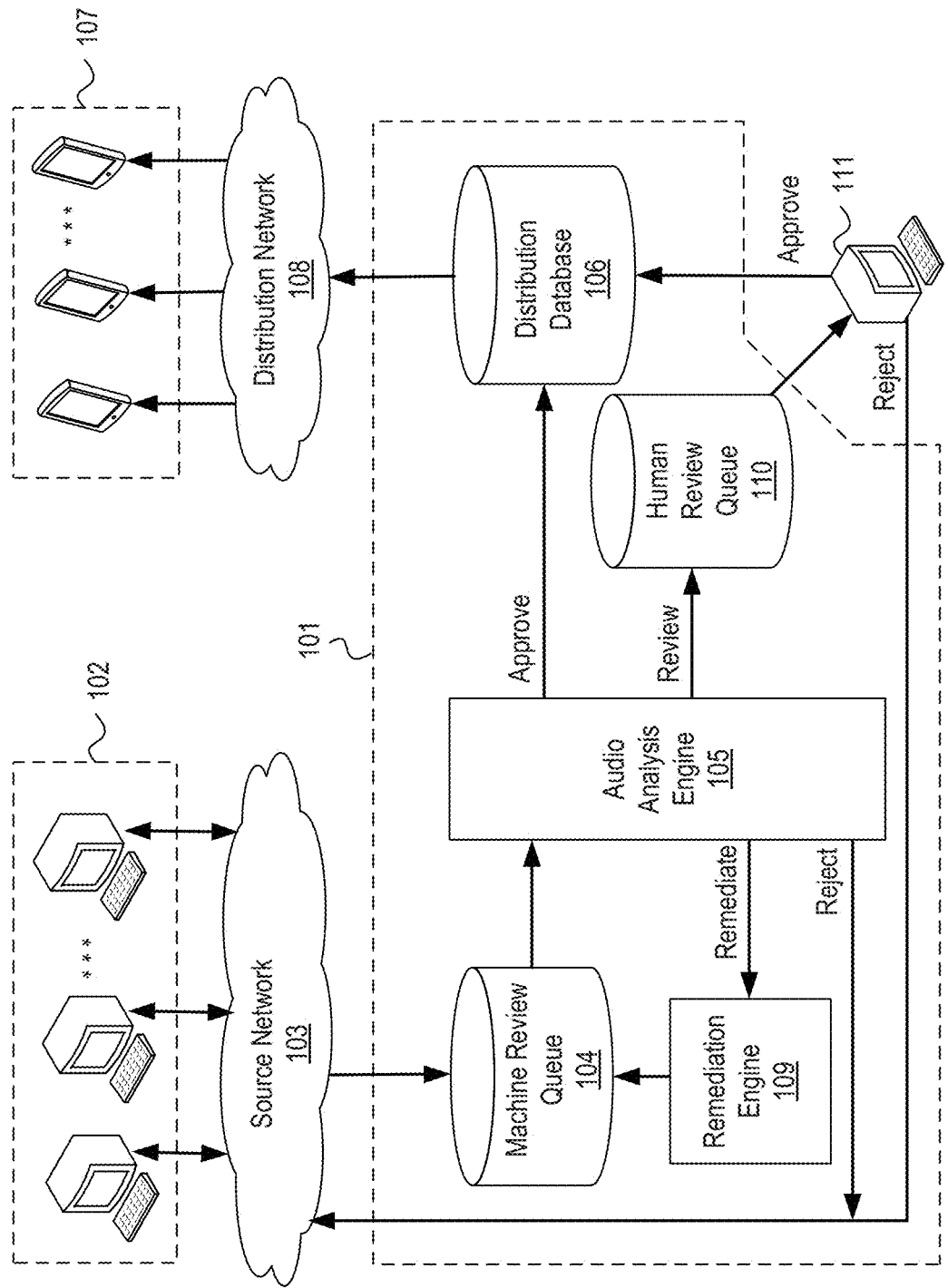
FIG. 1 shows a networking environment including an example system for determining whether individual audio files of a plurality of audio files are acceptable for distribution to a plurality of subscribers for playback.

FIG. 1 shows conceptual block diagram of a networking environment including an example system 101 configured to determine whether individual audio files of a plurality of audio files are acceptable for distribution to a plurality of subscribers 107 for playback. System 101 comprises a machine review queue 104, an audio analysis engine 105, a distribution database 106, a remediation engine 109, and a human review queue 110.

System 101 comprises one or more processors and one or more non-transitory computer readable media. The one or more processors may include one or more general purpose processors (e.g., programmable microprocessors) and/or special purpose processors (e.g., application specific integrated circuits ("ASICs"), single-purpose processors, and co-processors) now known or later developed. In example system 101, the audio analysis engine 105 and the remediation engine 109 comprise one or more such processors. Additionally, the one or more non-transitory computer readable media ("CRM") may include one or more volatile and/or non-volatile storage components (e.g., magnetic, optical, and/or flash memory components) now known or later developed. In example system 101, the machine review queue 104, distribution database 106, and human review queue 110 comprise one or more such non-transitory CRM.

System 101 also comprises one or more communications interfaces (not shown) configured to enable the system 101 to communicate with the plurality of audio file creators 102 over a source network 103 and to communicate with the plurality of subscribers 107 over a distribution network 108. The communication interfaces may be any type of wired, optical, and/or wireless interfaces now known or later developed.

In some embodiments, all of the components of the system 101 may be in a single computing system, e.g., a single server system comprising processor hardware, software, non-transitory CRM (e.g., databases, operational memory), and communications interfaces. In other embodiments, the functions of the components of the system 101 may be distributed across multiple computing systems, each system having one or more of its own processor hardware, software, non-transitory CRM, and communication interfaces.

In operation, system 101 is configured to receive and analyze a plurality of audio files from a plurality of audio file creators 102 via source network 103. Some audio file creators are humans (e.g., voice artists) hired, contracted, or otherwise made available to create individual audio files by using a computer equipped with a microphone and appropriate recording software to record themselves reading the text of a news story into the microphone to generate an audible version of the text-based news story as a computer-readable audio file, e.g., MP3, WAV, WMA, AAC, RIFF, or any other suitable audio file format now known or later developed. Other audio file creators may be computer programs configured to convert the text of the news story into an audible format via appropriate text to speech software.

Regardless of whether the audio file creator is a human or a computer, each audio file comprises an audible version of a corresponding text-based news story. Each text-based news story may be any type of news story (e.g., weather, sports, politics, local/national/international news, breaking news, finance, business, arts, entertainment) that may be written by a journalist, blogger, reporter, or other author, and published by a news outlet, media company, or other similar news distribution organization via a newspaper, television station, website, blog, or journal. Because news is constantly changing as new stories are created about current events and old stories are updated with new information, individual news stories are typically only "newsworthy" for a few hours or a few days at most. As a result, the system 101 may receive and subsequently analyze hundreds or even thousands of audio files from hundreds or even thousands of audio file creators 102 each day.

In operation, the system 101 receives the plurality of audio files from the plurality of audio file creators 102 over the source network 103. The source network 103 may comprise any one or more of the public Internet, a private network, a corporate network, a virtual private network, wire line, optical fiber, wireless, or any other type of network and/or network infrastructure now known or later developed, alone or in combination, that is configured to enable both (i) the plurality of audio file creators 102 to send the plurality of audio files to the system 101, and (ii) the system 101 to receive the plurality of audio files from the plurality of audio file creators 102.

The system 101 is configured to store each audio file received from the plurality of audio file creators into the machine review queue 104. The machine review queue 104 comprises one or more tangible, non-transitory CRMs configured to store computer readable data, including but not limited to the plurality of audio files. Some embodiments of the machine review queue 104 may also include one or more processors (not shown) configured to control the receipt and management of the audio files stored in the machine review queue 104. Likewise, in some embodiments, the machine review queue 104 may be implemented in a dedicated tangible, non-transitory CRM. In other embodiments, the machine review queue 104 may be implemented in a tangible, non-transitory CRM along with other data and/or databases (e.g., the distribution database 106 and the human review queue 110).

The audio analysis engine 105 comprises one or more processors configured to perform one or more of the audio file analysis functions described herein. In operation, the audio analysis engine 105 analyzes each audio file stored in the machine review queue 104. In some embodiments, the machine review queue 104 may be configured to send (e.g., transmit, upload, load) individual audio files to the audio analysis engine 105 for analysis. In other embodiments, the audio analysis engine 105 may be configured to obtain (e.g., request, receive, download, load) individual audio files from the machine review queue 104 into the audio analysis engine 105 for analysis. For each audio file stored in the machine review queue 104, the audio analysis engine 105 is configured to determine whether that audio file is acceptable for distribution to the plurality of subscribers 107 for playback.

In operation, the audio analysis engine 105 may implement any of the algorithms described herein (e.g., FIGS. 3A-E) or any other suitable algorithms to determine whether an individual audio file is acceptable for distribution to the plurality of subscribers 107 for playback. In particular, the audio analysis engine 105 is configured to assess one or more quality and/or accuracy measures of each audio file to determine the audio file's acceptability for distribution and playback.

If the audio analysis engine 105 determines that an audio file is acceptable for distribution to the plurality of subscribers 107 for playback based on the analysis of the quality and/or accuracy measures, then the audio analysis engine 105 will approve the audio file for distribution. In some embodiments, approving an individual audio file for distribution includes storing that individual audio file in the distribution database 106. The distribution database 106 comprises one or more tangible, non-transitory CRMs configured to store computer readable data, including but not limited to individual audio files that have been approved for distribution to the plurality of subscribers 107. Some embodiments of the distribution database 106 may also include one or more processors (not shown) configured to control the receipt and management of the audio files stored in the distribution database 106. Likewise, in some embodiments, the distribution database 106 may be implemented in a dedicated tangible, non-transitory CRM. In other embodiments, the distribution database 106 may be implemented in a tangible, non-transitory CRM along with other data and/or databases (e.g., the machine review queue 104 and the human review queue 110).

However, if the audio analysis engine 105 determines that an audio file is not acceptable for distribution to the plurality of subscribers 107 for playback, the audio analysis engine 105 may (i) reject the individual audio file, (ii) remediate the individual audio file (if applicable), and/or (iii) designate the individual audio file for review by a human.

In circumstances described herein where the audio analysis engine 105 determines that an audio file is not acceptable for distribution and cannot be remediated or cannot (or should not) be reviewed by a human, then the audio analysis engine 105 rejects the audio file. In some embodiments, rejecting the audio file may include notifying the audio file creator that the audio file has been rejected. In some embodiments, the notification may include (i) at least one reason for rejecting the audio file and/or (ii) a request that the audio file creator resend or otherwise resubmit a corrected version of the audio file.

Additionally, or alternatively, in circumstances where the audio analysis engine 105 determines that the audio file is not acceptable for distribution but can be remediated as described herein, then the audio analysis engine 105 sends (e.g., loads, uploads, transfers) the audio file to the remediation engine 109. The remediation engine 109 comprises one or more processors running software and configured to perform audio processing on the audio file to attempt to correct or at least ameliorate the quality deficiencies identified by the audio analysis engine 105 as described herein. After applying one or more appropriate audio processing algorithms to the audio file, the remediation engine 106 sends (e.g., stores, writes, loads, uploads, transfers, indexes) the remediated audio file to the machine review queue 104 so that the audio analysis engine 105 can analyze and determine whether the remediated audio file is acceptable for distribution and playback.

Additionally, or alternatively, if the audio analysis engine 105 determines that an audio file is not acceptable for distribution and playback based on the analysis performed by the audio analysis engine 105, but also not so flawed as to be rejected by the audio analysis engine 105 as described herein, then the audio analysis engine 105 may designate the audio file for human review. In some embodiments, designating the audio file for human review includes sending (i.e., writing, loading, uploading, transferring) the audio file to the human review queue 110.

The human review queue 110 comprises one or more tangible, non-transitory CRMs configured to store computer readable data, including but not limited to individual audio files that have been designated for human review by the audio analysis engine 105. Some embodiments of the human review queue 110 may also include one or more processors (not shown) configured to control the receipt and management of the audio files stored in the human review queue 110. Likewise, in some embodiments, the human review queue 110 may be implemented in a dedicated tangible, non-transitory CRM. In other embodiments, the human review queue 110 may be implemented in a tangible, non-transitory CRM along with other data and/or databases (e.g., the machine review queue 104 and the distribution database 106).

Once the audio file has been placed in the human review queue 110, a human working at one or more terminals 111 can review the audio file to determine whether to (i) approve the audio file for distribution and playback despite the results of the analysis performed by the audio analysis engine 105 or (ii) reject the audio file. In preferred embodiments, the system 101 determines whether a substantial majority of the audio files received from the plurality of audio file creators should be (i) approved for distribution and playback, (ii) remediated, and/or (iii) rejected. Preferably, the system 101 is configured to designate only a small minority of audio files for human review.

In some embodiments, approving an individual audio file for distribution includes storing that individual audio file in the distribution database 106. The distribution database 106 comprises one or more tangible, non-transitory CRMs configured to store computer readable data, including but not limited to individual audio files that have been approved for distribution to the plurality of subscribers 107. Some embodiments of the distribution database 106 may also include one or more processors (not shown) configured to control the receipt and management of the audio files stored in the distribution database 106. Likewise, in some embodiments, the distribution database 106 may be implemented in a dedicated tangible, non-transitory CRM. In other embodiments, the distribution database 106 may be implemented in a tangible, non-transitory CRM along with other data and/or databases (e.g., the machine review queue 104 and the human review queue 110).

II. Assessing Audio File Quality

As described herein, for each audio file stored in the machine review queue 104, the audio analysis engine 105 is configured to determine whether that audio file is acceptable for distribution to the plurality of subscribers 107 for playback. In operation, to determine whether the quality of the audio file is acceptable for distribution and playback, the audio analysis engine 105 may assess one more quality measures, including but not necessarily limited to one or more (or perhaps all) of (i) whether the audio file is in the requested format (e.g., file type/encoding scheme, bit rate, and sample rate), (ii) whether measured background noise (e.g., high end hiss, low end hum, static, and buzz) in the audio file is below a background noise threshold, (iii) whether average volume of the audio file is within an acceptable range, and/or (iv) whether peak volume of the audio file is below a peak volume threshold. The audio analysis engine 105 could be configured to use other audio quality metrics as well.

A. Audio File Format

In some embodiments, the audio analysis engine 105 determines whether an audio file is in a desired format, e.g., a desired file type/encoding scheme, desired bit rate, and desired sample rate. If the audio analysis engine 105 determines that the audio file is in the desired format, then the audio analysis engine 105 may continue with further analysis of the audio file.

However, if the audio analysis engine 105 determines that the audio file is not in the correct audio format but that the audio file can be remediated to correct the file format discrepancies, then the audio analysis engine 105 may send the audio file to the remediation engine 109 for correction. For example, if the audio file is the wrong file type (e.g., Windows Media Player format instead of MP3 format), then the remediation engine 109 can convert the audio file into the desired file type. Similarly, if the audio file has an incorrect sample rate (e.g., 96K sample rate versus 44K sample rate), the remediation engine 109 can convert the audio file to analog and resample the analog signal at the desired sample rate or compute values for new samples from the original samples to generate a revised version of the audio file at the desired sample rate. But if the audio analysis engine 105 determines that the audio file is not in the correct audio format and the audio file cannot be remediated to correct the file format discrepancies, then the audio analysis engine 105 may simply reject the audio file.

B. Background Noise

In some embodiments, the audio analysis engine 105 additionally or alternatively determines whether measured background noise (e.g., high end hiss, low end hum, static, and buzz) in the audio file is below a background noise threshold. In operation, the audio analysis engine 105 uses one or more known algorithms and/or software tools/programs to detect and/or measure background noise in the audio file. Next, the audio analysis engine 105 compares the detected/measured background noise with a background noise threshold. If the measured background noise is less than the background noise threshold, then the audio analysis engine 105 may continue with further analysis of the audio file.

However, if the measured background noise exceeds the background noise threshold, then the audio analysis engine 105 may send the audio file to the remediation engine 109. The remediation engine 109 (i) applies one or more known noise reduction algorithms or procedures (e.g., high pass filtering or low pass filtering) to the audio file to substantially remove or ameliorate the background noise, and (ii) sends the remediated audio file back to the machine review queue 104 for subsequent analysis by the audio analysis engine 105. But if upon subsequent analysis, the audio analysis engine 105 determines that the background noise in the audio file exceeds the background noise threshold (even after remediation), then the audio analysis engine 105 may reject the audio file.

C. Average Volume

In further embodiments, the audio analysis engine 105 additionally or alternatively determines whether average volume of the audio file is within an acceptable range, i.e., whether the average volume is above an minimum average volume threshold and below a maximum average volume threshold. In operation, the audio analysis engine 105 uses one or more known algorithms and/or software tools/programs to determine the average volume of the audio file. For example, in some embodiments, the audio analysis engine 105 determines the average volume based on the audio file waveform. If the average volume is above the minimum average volume threshold and below the maximum average volume threshold, then the audio analysis engine 105 may continue with further analysis of the audio file.

However, if the determined average volume is less than the minimum average volume threshold or greater than the maximum average volume threshold, then the audio analysis engine 105 may send the audio file to the remediation engine 109. The remediation engine 109 (i) applies one or more known algorithms for altering average volume of an audio file (e.g., dynamic range compression, limiter function) to increase or reduce the average volume as needed, and (ii) sends the remediated audio file to the back to the machine review queue 104 for subsequent analysis by the audio analysis engine 105. However, if upon subsequent analysis, the audio analysis engine 105 determines that the average volume of the audio file is still either below the minimum average volume threshold or above the maximum average volume threshold, then the audio analysis engine 105 may reject the audio file.

D. Peak Volume

In still further embodiments, the audio analysis engine 105 additionally or alternatively determines whether a peak volume of the audio file is below a peak volume threshold. In operation, the audio analysis engine 105 uses one or more known algorithms and/or software tools/programs to determine the peak volume of the audio file. Next, the audio analysis engine 105 compares the determined peak volume with a peak volume threshold. If the determined peak volume is less than the peak volume threshold, then the audio analysis engine 105 may continue with further analysis of the audio file.

However, if the determined peak volume exceeds the peak volume threshold, then the audio analysis engine 105 may send the audio file to the remediation engine 109. The remediation engine 109 (i) applies one or more known peak volume reduction algorithms (e.g., limiter function, dynamic range compression) to the audio file to reduce the peak volume, and (ii) sends the remediated audio file back to the machine review queue 104 for subsequent analysis by the audio analysis engine 105. But if upon subsequent analysis, the audio analysis engine 105 determines that the peak volume in the audio file exceeds the peak volume threshold (even after remediation), then the audio analysis engine 105 may reject the audio file.

III. Assessing Audio File Accuracy

In addition to (or perhaps instead of) assessing one or more of the above-described quality measures of the audio file, the audio analysis engine 105 may additionally or alternatively assess one or more accuracy measures of the audio file, including but not necessarily limited to one or more (or perhaps all) of: (i) whether words spoken in the audio file match (i.e., are the same as, or at least substantially the same as) the words in the audio file's corresponding text-based news story; (ii) whether the number of words spoken in the audio file match the number of words in the audio file's corresponding text-based news story; (iii) whether the number of sentences (indicated by the number of full stops in the audio) spoken in the audio file match the number of sentences in the audio file's corresponding text-based news story; and/or (iv) whether an estimated audio pace based on the number of words in the audio file's corresponding text-based news story and the duration of the audio file is within an expected range.

A. Word Match

In some embodiments, the audio analysis engine 105 assesses the accuracy of an audio file by determining whether and the extent to which words spoken in the audio file match (i.e., are the same as, or at least substantially the same as) the words in the audio file's corresponding text-based news story. In operation, some embodiments of the audio analysis engine 105: (i) implement one or more known speech-to-text algorithms to generate a text file of the audio file; (ii) compare the generated text file with the text of the audio file's corresponding text-based news story (i.e., the news story that the audio file creator presumably read to record the audio file); (iii) determine the percentage of words in the generated text file that match their corresponding words in the audio file's corresponding text-based news story; and (iv) compare the determined percentage with a word match threshold. If the percentage of words in the generated text file that match their corresponding words in the audio file's corresponding text-based news story exceeds the word match threshold, then the audio analysis engine 105 may either proceed with further analysis or conclude that the audio file is acceptable for distribution and playback.

For example, if the word match threshold is 95%, and if more than 95% of the words in the generated text file match their corresponding words in the audio file's corresponding text-based news story, then the audio analysis engine 105 may conclude that the audio file is acceptable for distribution, approve the audio file for distribution, and send (e.g., store, write, load, upload, transfer, index) the approved audio file to the distribution database 106. Similarly, if less than 95% of the words in the generated text file match their corresponding words in the audio file's corresponding text-based news story, then the audio analysis engine 105 may conclude that the audio file is inaccurate and therefore unacceptable for distribution and playback. The audio analysis engine 105 may then either (i) reject the audio file or (ii) designate the audio file for human review and send the unacceptable file to the human review queue 110.

Values other than 95% could be used for the word match threshold depending on operational considerations, e.g., tradeoffs between the level of accuracy required and capabilities of the implemented speech-to-text algorithm. Similarly, the word match threshold could correspond to a number of mismatched words rather than a percentage. For example, if the word match threshold is 10 mismatched words, and the audio analysis engine 105 determines that there are less than 10 mismatched words (i.e., words in the generated text file that do not match their corresponding words in the audio file's corresponding text-based news story), the audio analysis engine 105 may conclude that the audio file is accurate and accept the audio file for distribution.

Sometimes a particular audio file may miss the word match threshold by only a small amount because of insignificant and/or non-substantive differences between the audio file and its corresponding text-based news story or even an erroneously low word match determination caused by mistakes in speech-to-text processing. Because a news story is "newsworthy" typically for only a few hours to a few days at most, it may be quicker and thus more desirable, for a human to review a questionable audio file to determine whether the audio file is acceptable for distribution rather than waiting for the audio file creator (or perhaps even a different audio file creator) to submit a new audio file for the news story.

Accordingly, some embodiments of the system 101 may implement both a word match approval threshold and a word match rejection threshold, where the audio analysis engine 105 (i) approves any audio file that exceeds the word match approval threshold, (ii) rejects any audio file that falls below the word match rejection threshold, and (iii) designates for human review any audio file between the word match rejection threshold and the word match acceptance threshold. For example, if the word match approval threshold is set at 95% and the word match rejection threshold is set at 90%, then the audio analysis engine 105 would (i) approve any audio file where more than 95% of the words in the generated text file match their corresponding words in the audio file's corresponding text-based news story, (ii) reject any audio file where less than 90% of the words in the generated text file match their corresponding words in the audio file's corresponding text-based news story, and (iii) designate for human review any audio file where more than 90% but less than 95% of the words in the generated text file match their corresponding words in the audio file's corresponding text-based news story.

B. Word Count

In further embodiments, the audio analysis engine 105 additionally or alternatively assesses the accuracy of an audio file by determining whether and the extent to which the number of words spoken in the audio file matches the number of words in the audio file's corresponding text-based news story. In some embodiments, the audio analysis engine 105 (i) estimates the number of words in the audio file (i.e., generating a word count), (ii) compares the estimated number of words in the audio file with the number of words in the audio file's corresponding text-based news story; and (iii) determines whether any difference between the estimated number of words in the audio file and the number of words in the audio file's corresponding text-based news story is greater than a word count threshold.

In operation, the audio analysis engine 105 may estimate the number of words spoken in the audio file in one or more ways. For example, in some embodiments, the audio analysis engine 105 may implement one or more known speech-to-text algorithms to generate a text file from the audio file, and then count the number of words in the generated text file. In other embodiments, the audio analysis engine 105 may analyze the waveform of the audio file to identify short breaks (i.e., absence of signal in the time domain and/or absence of spectral information in the frequency domain) corresponding to short periods of silence between spoken words as shown and described in more detail with reference to FIG. 2. The audio analysis engine 105 may then use the identified short breaks to estimate the number of words in the audio file.

If the word count threshold is +/−5%, and if the audio analysis engine 105 determines that the estimated number of words in an audio file differs from the number of words in the audio file's corresponding text-based news story by less than 5% (i.e., the audio analysis engine 105 determines the audio file to have less than 5% more or 5% fewer words than the audio file's corresponding text-based news story), then the audio analysis engine 105 may either proceed with further analysis of the audio file or conclude that the audio file is acceptable for distribution and playback. Similarly, if the audio analysis engine 105 determines that the estimated number of words in the audio file differs from the number of words in the audio file's corresponding text-based news story by greater than 5% (i.e., the audio analysis engine 105 determines the audio file to have greater than 5% more or 5% fewer words than the audio file's corresponding text-based news story), then the audio analysis engine 105 may conclude that the audio file is inaccurate and therefore unacceptable for distribution and playback. The audio analysis engine 105 may then either (i) reject the audio file or (ii) designate the audio file for human review and send the unacceptable file to the human review queue 110.

Values other than +/−5% could be used for the word count threshold. Similarly the word count threshold could correspond to a number of words (e.g., 5 words) rather than a percentage. For example, if the word count threshold is 5 words, and the audio analysis engine 105 determines the audio file to have 5 more or less words than the audio file's corresponding text-based news story, the audio analysis engine 105 may conclude that the audio file is accurate and accept the audio file for distribution.

Similar to the word match scenario described previously, sometimes a particular audio file may miss the word count threshold by only a small amount because of insignificant and/or non-substantive differences between the audio file and its corresponding text-based news story or even a flawed word count determination caused by errors in the speech-to-text processing or errors in the analysis of the audio waveform, depending on the word count method employed.

Accordingly, some embodiments of the system 101 may implement both a word count approval threshold and a word count rejection threshold, where the audio analysis engine 105 (i) approves any audio file that falls within the word count approval threshold, (ii) rejects any audio file that falls outside the word count rejection threshold, and (iii) designates for human review any audio file with a word count determination falling between the word count rejection threshold and the word count acceptance threshold.

For example, if the word count approval threshold is set at +/−5% and the word count rejection threshold is set at +/−10%, then the audio analysis engine 105 would (i) approve any audio file determined to have less than 5% more or 5% fewer words than the audio file's corresponding text-based news story, (ii) reject any audio file determined to have greater than 10% more or 10% fewer words than the audio file's corresponding text-based news story, and (iii) designate for human review any audio file determined to have greater than 5% more or 5% fewer words, but less than 10% more or 10% fewer words than the audio file's corresponding text-based news story.

C. Sentence Count

In still further embodiments, the audio analysis engine 105 additionally or alternatively assesses the accuracy of an audio file by determining whether and the extent to which the number of sentences spoken in the audio file matches the number of sentences in the audio file's corresponding text-based news story. For example, in some embodiments, the audio analysis engine 105 (i) estimates the number of sentences in the audio file (i.e., generating a sentence count), (ii) compares the estimated number of sentences in the audio file with the number of sentences in the audio file's corresponding text-based news story; and (iii) determines whether any difference between the estimated number of sentences in the audio file and the number of sentences in the audio file's corresponding text-based news story is greater than a sentence count threshold.

In operation, the audio analysis engine 105 may estimate the number of sentences spoken in the audio file in one or more ways. In some embodiments, the audio analysis engine 105 may implement one or more known speech-to-text algorithms to generate a text file from the audio file, and then count the number of sentences in the generated text file. In other embodiments, the audio analysis engine 105 may analyze the waveform of the audio file to identify breaks (i.e., absence of signal in the time domain and/or absence of spectral information in the frequency domain) corresponding to periods of silence that are slightly longer than the periods of silence between spoken words (as described previously), as shown and described in more detail with reference to FIG. 2. The audio analysis engine 105 may then use the identified periods of silence to determine the number of sentence breaks, and thus, the likely number of sentences spoken in the audio file.

If the sentence count threshold is +/−5%, and if the audio analysis engine 105 determines that the estimated number of sentences in an audio file differs from the number of sentences in the audio file's corresponding text-based news story by less than 5% (i.e., the audio analysis engine 105 determines the audio file to have less than 5% more or 5% fewer sentences than the audio file's corresponding text-based news story), then the audio analysis engine 105 may either proceed with further analysis of the audio file or conclude that the audio file is acceptable for distribution and playback. Similarly, if the audio analysis engine 105 determines that the estimated number of sentences in the audio file differs from the number of sentences in the audio file's corresponding text-based news story by greater than 5% (i.e., the audio analysis engine 105 determines the audio file to have greater than 5% more or 5% fewer sentences than the audio file's corresponding text-based news story), then the audio analysis engine 105 may conclude that the audio file is inaccurate and therefore unacceptable for distribution and playback. The audio analysis engine 105 may then either (i) reject the audio file or (ii) designate the audio file for human review and send the unacceptable file to the human review queue 110.

Values other than +/−5% could alternatively be used for the sentence count threshold. Similarly, the sentence count threshold could correspond to a number of sentences (e.g., +/−2 sentences) rather than a percentage. For example, if the sentence count threshold is 2 sentences, and the audio analysis engine 105 determines the audio file to have 2 more or less sentences than the audio file's corresponding text-based news story, the audio analysis engine 105 may conclude that the audio file is accurate and accept the audio file for distribution.

Similar to the word match and word count scenarios described previously, sometimes a particular audio file may miss the sentence count threshold by only a small amount because of insignificant and/or non-substantive differences between the audio file and its corresponding text-based news story or even a flawed sentence count determination caused by errors in the speech-to-text processing or errors in the analysis of the audio waveform, depending on the sentence count method employed.

Accordingly, some embodiments of the system 101 may implement both a sentence count approval threshold and a sentence count rejection threshold, where the audio analysis engine 105 (i) approves any audio file that falls within the sentence count approval threshold, (ii) rejects any audio file that falls outside the sentence count rejection threshold, and (iii) designates for human review any audio file with a sentence count determination falling between the sentence count rejection threshold and the sentence count acceptance threshold.

For example, if the sentence count approval threshold is set at +/−5% and the sentence count rejection threshold is set at +/−10%, then the audio analysis engine 105 would (i) approve any audio file determined to have less than 5% more or 5% fewer sentences than the audio file's corresponding text-based news story, (ii) reject any audio file determined to have greater than 10% more or 10% fewer sentences than the audio file's corresponding text-based news story, and (iii) designate for human review any audio file determined to have greater than 5% more or 5% fewer sentences, but less than 10% more or 10% fewer sentences than the audio file's corresponding text-based news story.

D. Audio File Duration

In still further embodiments, the audio analysis engine 105 additionally or alternatively assesses the accuracy of an audio file by determining whether and the extent to which the actual duration of an audio file exceeds an expected duration of the audio file. For example, in some embodiments, the audio analysis engine 105 (i) estimates the duration of the audio file by multiplying the number of words in the audio file's corresponding text-based news story by a typical word pace (or word pace range), (ii) compares the estimated duration (or duration range) of the audio file with the actual duration of the audio file, and (iii) determines whether the difference (if any) between the audio file's estimated duration and actual duration is greater than a duration threshold.

For example, if the typical word pace is set to 155 words-per-minute, and if the text-based news story has 863 words, then the expected duration of the audio file corresponding to the text-based news story would be 863 words multiplied by $1/155$ minutes per word, or 5.6 minutes. Similarly, if the typical word pace is set to a range of 150-160 words-per-minute, and if the text-based news story has 863 words, then the expected duration of the corresponding audio file would be 5.75-5.39 minutes. If the actual duration of the audio file is within a threshold range (e.g., +/−3%), then the audio analysis engine 105 may either proceed with further analysis of the audio file or conclude that the audio file is acceptable for distribution and playback. However, if the audio analysis engine 105 determines that the actual duration of the audio file differs from the estimated duration of the audio file by greater than the threshold (e.g., +/−3%) (or if the actual duration is outside of the expected duration range), then the audio analysis engine 105 may conclude that the audio file is inaccurate and therefore unacceptable for distribution and playback. The audio analysis engine 105 may then either (i) reject the audio file or (ii) designate the audio file for human review and send the audio file to the human review queue 110.

Values other than +/−3% could be used for the duration threshold as well. Similarly the duration threshold could correspond to a number of seconds (e.g., +/−7 seconds) rather than a percentage. For example, if the duration threshold is 7 seconds, and the audio analysis engine 105 determines the audio file to be less than 7 seconds shorter or 7 seconds longer than the expected duration, the audio analysis engine 105 may conclude that the audio file is accurate and accept the audio file for distribution.

Similar to the word match, word count, and sentence count scenarios described previously, sometimes a particular audio file may miss the duration threshold by only a small amount. Accordingly, some embodiments of the system 101 may implement both a duration approval threshold and a duration rejection threshold, where the audio analysis engine 105 (i) approves any audio file that falls within the duration approval threshold, (ii) rejects any audio file that falls outside of the duration rejection threshold, and (iii) designates for human review any audio file with a duration falling between the duration rejection threshold and the duration acceptance threshold.

For example, if the duration approval threshold is set at +/−5% and the duration rejection threshold is set at +/−10%, then the audio analysis engine 105 would (i) approve any audio file whose actual duration is within +/−5% of its expected duration, (ii) reject any audio file whose actual duration is more than +/−10% of its expected duration, and (iii) designate for human review any audio file whose actual duration is greater than +/−5% of its expected duration, but less than +/−10% of its expected duration.

E. Audio Pace

In yet further embodiments, the audio analysis engine 105 additionally or alternatively assesses the accuracy of an audio file by (i) determining the number of words in an audio file's corresponding text-based news story, (ii) determining the actual duration of the audio file, (iii) calculating the pace (words-per-minute rate) of the audio file by dividing the determined number of words in the corresponding text-based news story by the determined duration of the audio file, and (iv) determining whether the calculated pace is within a pace threshold (i.e., within a threshold range of a target pace).

For example, if the target pace is 155 words-per-minute, and if the pace threshold is +/−5% of the target pace, then the audio analysis engine 105 would determine whether the calculated pace is within +/−5% of the target pace (i.e., 147.3-162.8 words-per-minute). If a text-based news story has 944 words, and if the duration of the audio file corresponding to that text-based news story is 5.93 minutes, then the audio analysis engine 105 would calculate the actual pace of the audio file as 944 words/5.93 minutes, or 159 words-per-minute, and thus, conclude that the calculated pace is within the pace threshold. More generally, if the calculated pace is within a threshold range (e.g., within +/−5%) of the target pace, then the audio analysis engine 105 may either proceed with further analysis of the audio file or conclude that the audio file is acceptable for distribution and playback. However, if the audio analysis engine 105 determines that the calculated pace of the audio file is outside of the pace threshold (e.g., more than +/−5% of the target pace), then the audio analysis engine 105 may conclude that the audio file is inaccurate and therefore unacceptable for distribution and playback. The audio analysis engine 105 may then either (i) reject the audio file or (ii) designate the audio file for human review and send the audio file to the human review queue 110.

Values other than +/−5% could be used for the pace threshold as well. Similarly the pace threshold could correspond to a number of words-per-minute (e.g., +/−10 words-per-minute) rather than a percentage. For example, if the target pace is 155 words-per-minute, the pace threshold is 10 words-per-minute, and the audio analysis engine 105 determines the audio file to be between 145 and 165 words-per-minute, then the audio analysis engine 105 may conclude that the audio file is accurate and accept the audio file for distribution.

Similar to the word match, word count, sentence count, and duration scenarios described previously, sometimes a particular audio file may miss the pace threshold by only a small amount. Accordingly, some embodiments of the system 101 may implement both a pace approval threshold and a pace rejection threshold, where the audio analysis engine 105 (i) approves any audio file that falls within the pace approval threshold, (ii) rejects any audio file that falls outside of the pace rejection threshold, and (iii) designates for human review any audio file with a pace falling between the pace rejection threshold and the pace acceptance threshold.

For example, if the pace approval threshold is set at +/−5% of the target pace and the pace rejection threshold is set at +/−10% of the target pace, then the audio analysis engine 105 would (i) approve any audio file whose calculated pace is within +/−5% of the target pace, (ii) reject any audio file whose calculated pace is more than +/−10% of the target pace, and (iii) designate for human review any audio file whose calculated pace is greater than +/−5% of the target pace, but less than +/−10% the target pace.

IV. Audio Waveform Analysis

Figure 2:
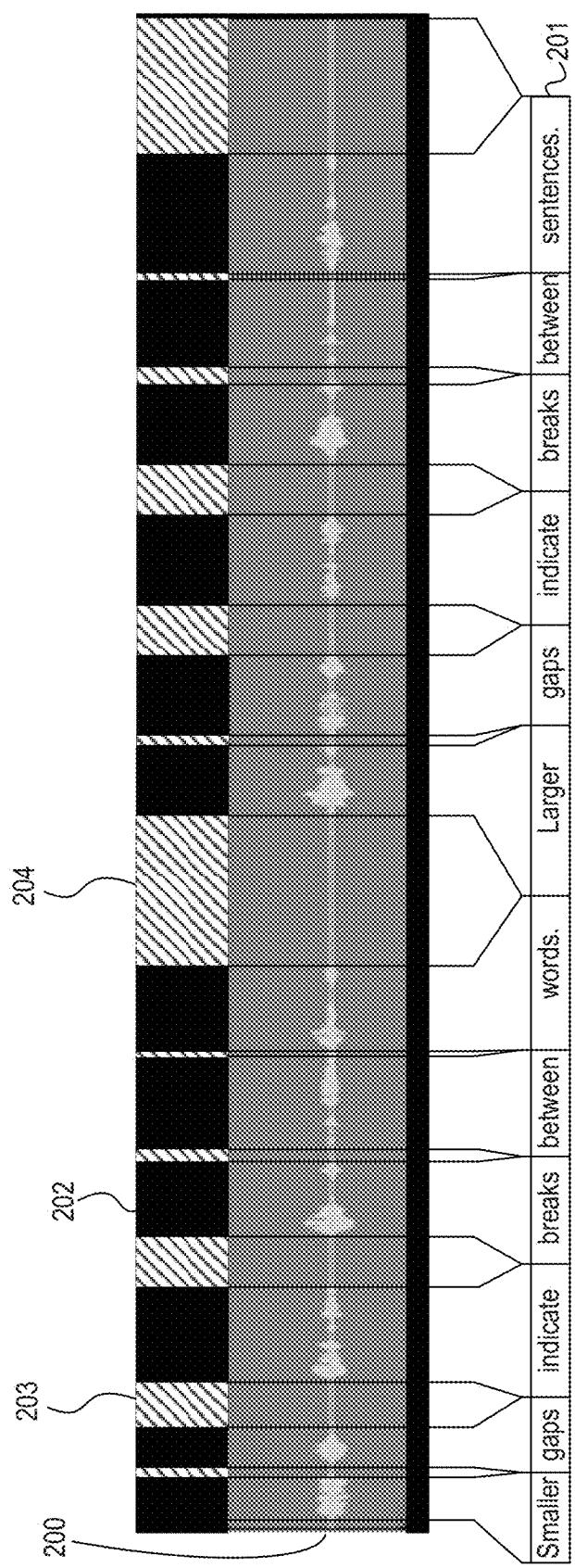
FIG. 2 shows a portion of a waveform of an example audio file for analysis by a computing system configured to implement one or more of the audio file analysis algorithms shown and described herein to determine whether an audio file is acceptable for distribution to a plurality of subscribers for playback.

FIG. 2 shows a portion of a waveform 200 of an example audio file for analysis by a computing system (e.g., system 101 of FIG. 1) configured to implement one or more of the audio file analysis algorithms shown and described herein to determine whether an audio file is acceptable for distribution to a plurality of subscribers for playback.

In some embodiments, the audio analysis engine 105 may analyze the waveform 200 to determine one or more of the background noise, peak volume, and/or average volume of the audio file. Likewise, in some embodiments, the audio analysis engine 105 may additionally or alternatively analyze the waveform 200 of an audio file to estimate one or more of the number of words (i.e. word count) and/or the number for sentences (i.e., sentence count) in an audio file.

The waveform 200 in FIG. 2 corresponds to the words shown in line 201 of FIG. 2, and each word in line 201 has corresponding time-domain signal components in the waveform 200. In operation, the audio analysis engine 105 (FIG. 1) analyzes the waveform 200 to identify the absence of signal in the time domain (and/or absence of spectral information in the frequency domain (not shown)) corresponding to periods of silence in the audio file. These periods of silence correspond to the gaps or breaks between words and sentences, where smaller gaps typically indicate breaks between words and larger gaps typically indicate breaks between sentences.

For example, the black portions, e.g. 202, along the top of the waveform 200 correspond to times when a signal (and thus likely a word) is present in the waveform 200. The hatched portions, e.g., 203 and 204, along the top of waveform correspond to times when a signal is absent in the waveform 200. These hatched portions correspond to breaks between words and/or sentences. For example, hatched portion 203 corresponds to the break between the words "gaps" and "indicate" in the first sentence of line 201. Similarly, hatched portion 204 corresponds to the break between the first and second sentences of line 201. As expected, hatched portion 203 corresponding to a word break is smaller than hatched portion 204 corresponding to a sentence break, sometimes referred to a full stop.

V. Example Algorithms

FIGS. 3A-E show example algorithms implemented by a computing system for determining whether an audio file should be (i) accepted for distribution to a plurality of subscribers for playback, (ii) rejected, (iii) remediated and re-analyzed, or (iv) reviewed by a human. In FIGS. 3A-E, method 300 is performed by software executed on a computing system, such system 101 shown and described with respect to FIG. 1. It should be understood, however, that in other examples, the algorithm 300 could alternatively be implemented by system 101 in combination with other network equipment and computing devices. Although the blocks are illustrated in a sequential order, the functions illustrated by the blocks may also be performed in parallel, and/or in another order different than shown and described herein. Additionally, in some embodiments, a computing system (e.g., system 101 or a similar computing system) may perform one or more portions or sub-parts of the algorithms shown in FIGS. 3A-E without performing one or more other portions or subparts.

Likewise, in some embodiments, a computing system may (i) perform multiple selected algorithms, portions, or subparts of algorithms, (ii) assign a score to the outcome of one or more of the results, and (iii) determine whether an audio file should be approved, rejected, remediated, or designated for human review based on one or more of the assigned scores. For example, a computing system may score each quality and/or accuracy metric considered (e.g., based on the extent to which the audio file meets or exceeds a target metric), and then average (straight or weighted average) the scores to determine whether the audio file should be approved, rejected, remediated, or designated for human review.

Additionally, in some embodiments, a computing system may implement one or more of the quality assessment algorithms and/or one or more of the accuracy assessment algorithms, and then approve an individual audio file for distribution only if the audio file meets every threshold requirement for every quality and accuracy metric assessed.

In still further embodiments, the computing system may employ a prioritized funnel technique of applying different algorithms in sequence based on the outcome of the previous assessment. For example, if an audio file meets the quality thresholds and the word match threshold, then the computing system may approve the audio file for distribution without further analysis, e.g., without applying the word count, sentence count, duration, and/or pace algorithms. But if the audio file meets the quality thresholds and fails to meet the word match threshold, then the computing system may apply one or more additional algorithms, e.g. one or more of the word count, sentence count, duration, and/or pace algorithms. In such embodiments, the computing system may approve an audio file for distribution that does not meet the word match threshold if the audio file meets one or more of the word count, sentence count, and duration thresholds. Computing systems may additionally or alternatively implement other combinations of the quality and accuracy algorithms as well.

A. Quality Assessment Algorithms

Algorithm 300 begins at block 301, which includes receiving an audio file. The received audio file may be the same or substantially the same as the audio files described herein. In operation, the audio file received at block 301 corresponds to a text-based news story.

Block 302 includes storing the audio file in a tangible, non-transitory computer readable media. At block 303, the audio file is retrieved from the CRM for analysis.

At block 304, algorithm 300 includes determining whether the audio file is in the correct format (e.g., a desired file type/encoding scheme, bit rate, sample rate). If the audio file is in the correct format, then the algorithm 300 proceeds to block 307.

But if the audio file is not in the correct format, then at block 305, algorithm 300 includes determining whether the audio file can be reformatted or otherwise converted to the correct format. If the incorrectly formatted audio file cannot be corrected, then the algorithm 300 rejects the audio file at block 310. But if the incorrectly formatted audio file can be reformatted or otherwise converted to the correct format, then algorithm 300 proceeds to block 306, where the audio file is converted to the correct format. After converting the audio file to the proper format at block 306, algorithm 300 proceeds to block 307.

Block 307 includes measuring the background noise of the audio file and comparing the measured background noise with a background noise threshold. If the measured background noise is less than or equal to the background noise threshold, then the algorithm 300 proceeds to block 311. However, if the background noise is greater than the background noise threshold, then the algorithm 300 proceeds to block 308, where one or more known noise reduction algorithms are applied to the audio file. After performing the noise reduction at block 308, the algorithm 300 proceeds to block 309. At block 309, the algorithm 300 determines whether any background noise remaining after block 308 is less than or equal to the background noise threshold. If the remaining background noise still exceeds the background noise threshold, then the algorithm 300 rejects the audio file at block 310. But if the remaining background noise (if any) is less than or equal to the background noise threshold, then the algorithm 300 proceeds to block 311.

Block 311 includes determining the average volume of the audio file, and determining whether the average volume is greater than or equal to a lower average volume threshold but less than or equal to an upper average volume threshold. If the average volume of the audio file is either above the upper average volume threshold or below the lower average volume threshold, then the algorithm 300 proceeds to block 312.

At block 312, the algorithm 300 includes applying a dynamic range compression function to the audio file to reduce the volume of louder portions of the audio file or boost/amplify quieter portions of the audio file by narrowing (or compressing) the dynamic range of the audio file.

After performing the dynamic range compression function at block 312, the algorithm 300 proceeds to block 313, which includes determining whether the average volume after the dynamic range compression performed at block 312 is still outside of the average volume threshold range, i.e., whether the average volume is still either greater than the upper average volume threshold or lower than the lower average volume threshold. If the average volume of the audio file is still outside of the average volume threshold range, then algorithm 300 rejects the audio file at block 310. But if the average volume is within the average volume threshold range, i.e., greater than or equal to the lower average volume threshold and less than or equal to the upper volume threshold range, then the algorithm 300 proceeds to block 314.

Block 314 includes determining the peak volume of the audio file, and determining whether the peak volume is less than or equal to a peak volume threshold. If the peak volume is less than or equal to the peak volume threshold, then the algorithm 300 proceeds to block 317.

If the peak volume of the audio file exceeds the peak volume threshold, then the algorithm proceeds to block 315, which includes applying a limiter function to the audio file to reduce the volume of the loudest portion(s) in the audio file. Additionally or alternatively, block 315 may also include applying a dynamic range compression algorithm to reduce the volume of louder portion(s) in the audio file by narrowing (or compressing) the dynamic range of the audio file. After the limiting and/or dynamic range compression has been performed at block 315, the algorithm proceeds to block 316, which includes determining whether the peak volume after the limiting/dynamic range compression performed at block 315 is less than or equal to the peak volume threshold. If the peak volume still exceeds the peak volume threshold, then the algorithm 300 will reject the audio file at block 310. But if the peak volume is less than or equal to the peak volume threshold, then the algorithm 300 proceeds to block 317.

Figure 3A:
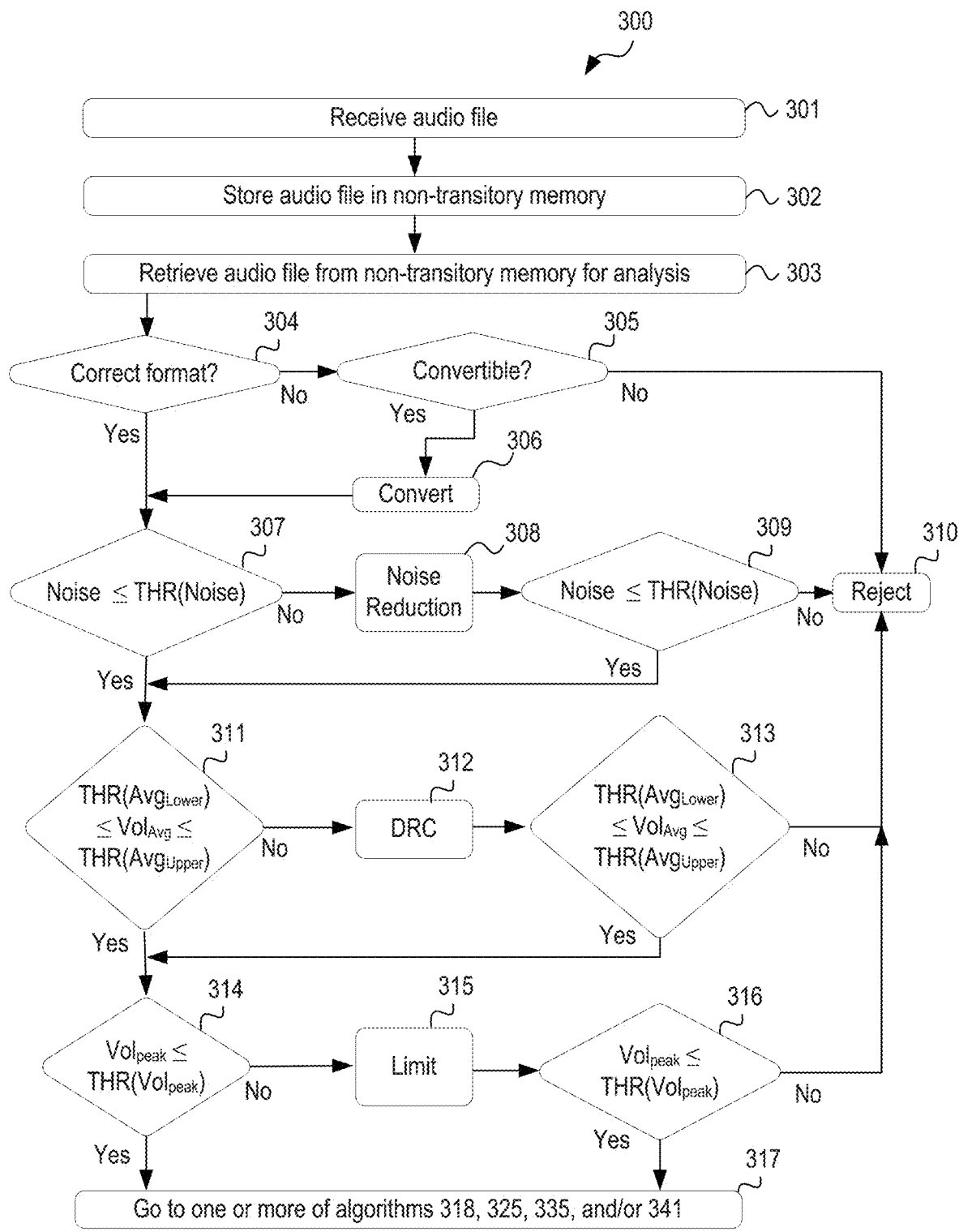
FIG. 3A shows an example algorithm implemented by a computing system for determining whether an audio file should be (i) accepted for distribution to a plurality of subscribers for playback, (ii) remediated, or (iii) rejected.
Figure 3B:
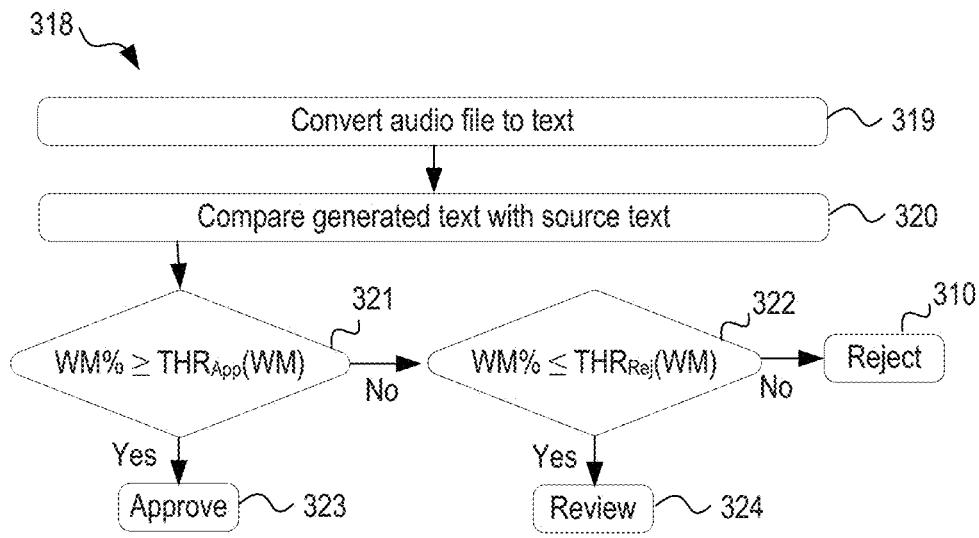
FIG. 3B shows an example algorithm implemented by a computing system for determining whether an audio file should be (i) accepted for distribution to a plurality of subscribers for playback, (ii) reviewed by a human, or (iii) rejected.
Figure 3C:
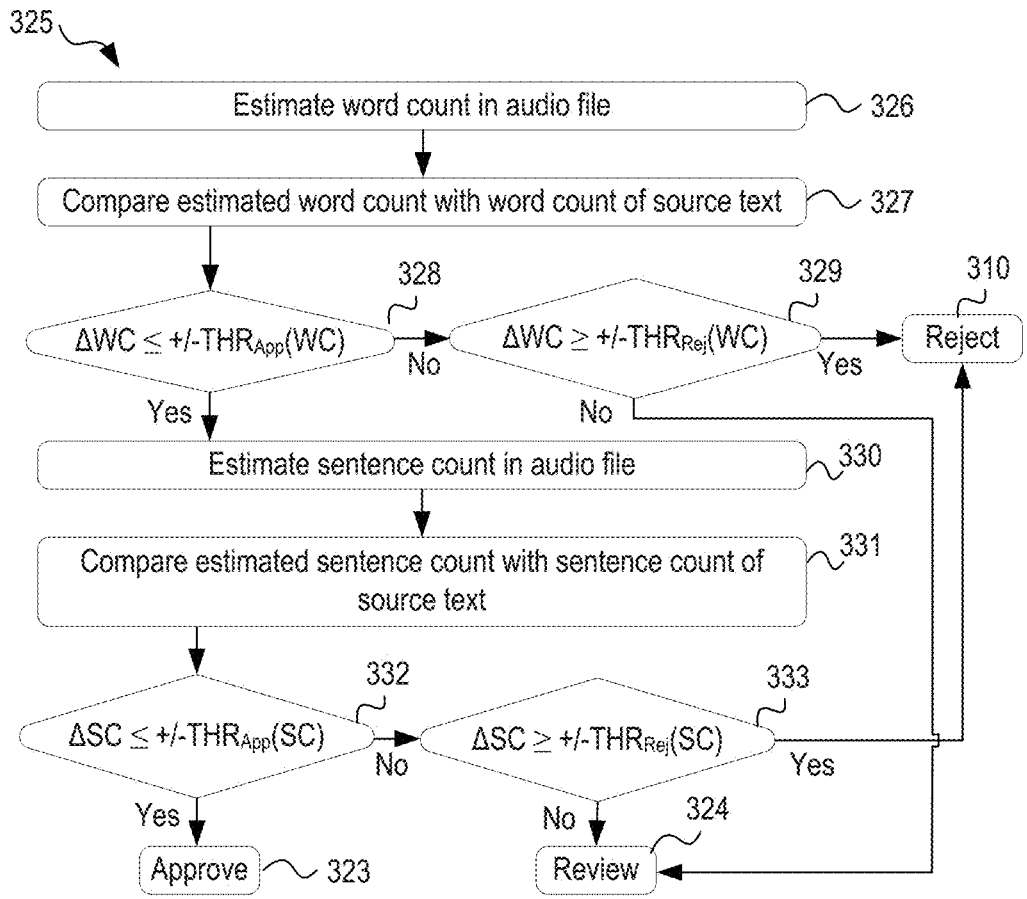
FIG. 3C shows another example algorithm implemented by a computing system for determining whether an audio file should be (i) accepted for distribution to a plurality of subscribers for playback, (ii) reviewed by a human, or (iii) rejected.
Figure 3D:
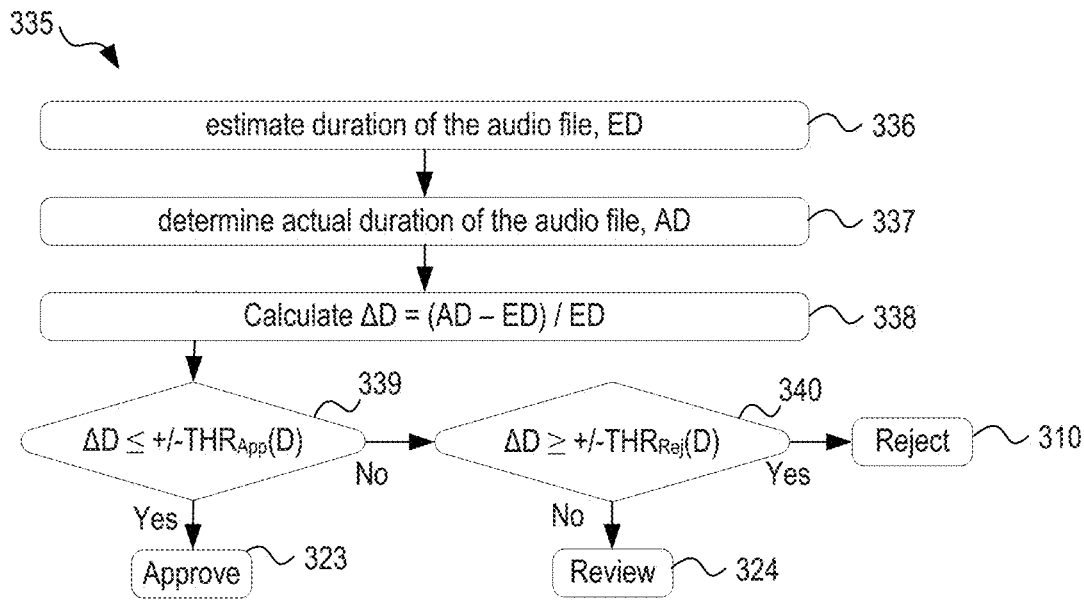
FIG. 3D shows yet another example algorithm implemented by a computing system for determining whether an audio file should be (i) accepted for distribution to a plurality of subscribers for playback, (ii) reviewed by a human, or (iii) rejected.
Figure 3E:
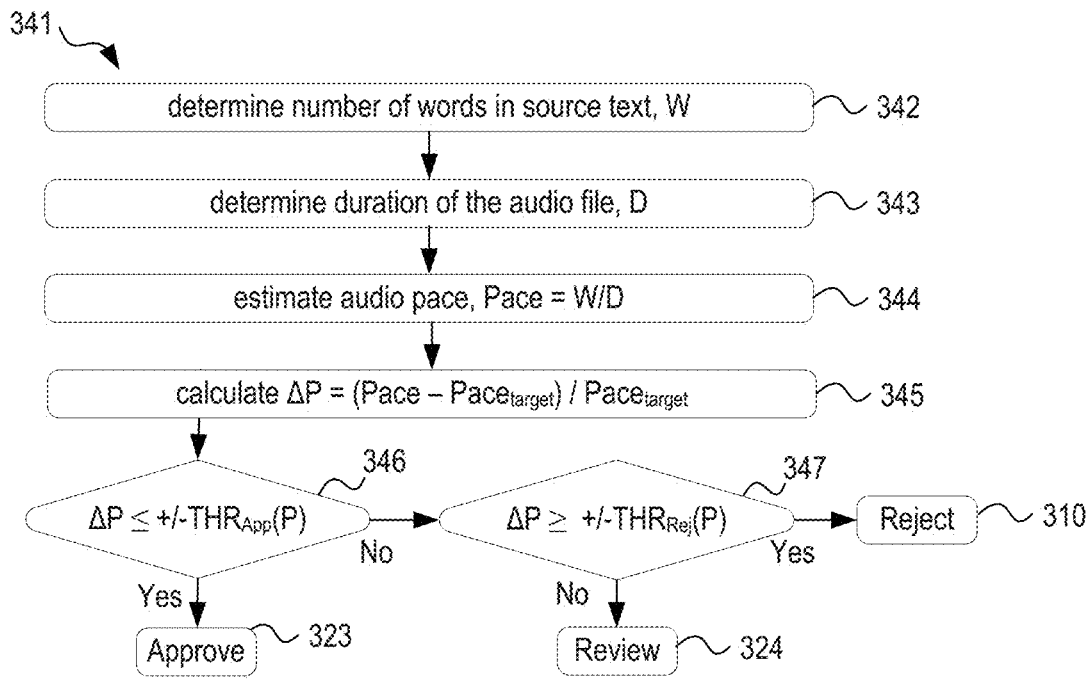
FIG. 3E shows another example algorithm implemented by a computing system for determining whether an audio file should be (i) accepted for distribution to a plurality of subscribers for playback, (ii) reviewed by a human, or (iii) rejected.

At block 317, algorithm 300 advances to one or more of algorithms 318 (FIG. 3B), 325 (FIG. 3C), 335 (FIG. 3D), and/or 341 (FIG. 3E).

B. Accuracy Assessment Algorithms

FIG. 3B depicts algorithm 318 for assessing the accuracy of an audio file by determining whether and the extent to which words spoken in the audio file match (i.e., are the same as, or at least substantially the same as) the words in the audio file's corresponding text-based news story.

Algorithm 318 begins at block 319, which includes converting the audio file to text using any one or more known speech-to-text functions. Next, at block 320, the algorithm 318 compares the text generated by the speech-to-text function with the text of the audio file's corresponding text-based news story. In operation, block 320 includes comparing each word in the text generated from the audio file with that word's corresponding word in the text of the audio file's corresponding text-based news story. The comparison at block 320 also includes determining a word match percentage, which corresponds to the percentage words in the generated text (from the audio file) match their corresponding words in the text of the audio file's corresponding text-based news story.

Block 321 includes determining whether the word match percentage is greater than or equal to a word match approval threshold. For example, if the word match approval threshold is 95%, and if the word match percentage determined at block 320 is 96%, then the word match percentage (i.e., 96%) would be greater than or equal to the word match approval threshold (i.e., 95%). In such an instance, the algorithm approves the audio file for distribution at block 323.

But if at block 321, the algorithm 318 determines that the word match percentage is not greater than or equal to the word match approval threshold, then algorithm 318 proceeds to block 322, which includes determining whether the word match percentage is greater than or equal to a word match rejection threshold. If the word match percentage is not greater than or equal to the word match rejection threshold, then the algorithm 318 rejects the audio file at block 310. But if the word match percentage is greater than or equal to the word match rejection threshold, then at block 324, the algorithm will designate the audio file for review by a human.

FIG. 3C shows algorithm 325 for assessing the accuracy of an audio file by determining (i) whether and the extent to which the number of words spoken in the audio file matches the number of words in the audio file's corresponding text-based news story, and (ii) whether and the extent to which the number of sentences spoken in the audio file matches the number of sentences in the audio file's corresponding text-based news story.

At block 326, the algorithm 325 estimates the number of words (e.g., the word count) in the audio file. In operation, estimating the word count may include (i) converting the audio file into a text file with a known speech-to-text conversion algorithm and counting the words in the text file and/or (ii) analyzing the audio file's waveform and counting the words based on the small portions of silence between words in the time domain waveform as described herein with reference to FIG. 2.

Block 327 includes comparing the word count of the audio file estimated at block 326 with the actual word count (i.e., number of words) in the text of the audio file's corresponding text-based news story. Block 327 also includes determining a word count delta, which corresponds to the percentage difference between the audio file's estimated word count determined in block 326 and the actual word count of the audio file's corresponding text-based news story.

Block 328 includes determining whether the word count delta is less than or equal to a word count approval threshold. For example, if the word count approval threshold is +/−5%, and if the word count delta determined at block 327 is +3% (i.e., the number of words estimated in the audio file exceeds the actual number of words in the audio file's corresponding text-based news story), then the word count delta (i.e., +3%) would be less than or equal to the word count approval threshold (i.e., +/−5%). In such an instance, the algorithm 325 approves the audio file for distribution at block 323.

But if at block 328, the algorithm 325 determines that the word count delta is greater than the word count approval threshold, then algorithm 325 proceeds to block 329, which includes determining whether the word count delta is greater than or equal to a word count rejection threshold. If the word count delta is greater than or equal to the word count rejection threshold, then the algorithm 325 rejects the audio file at block 310. But if the word count delta is less than the word match rejection threshold, then the algorithm 325 will designate the audio file for review by a human at block 324.

At block 330, the algorithm 325 estimates the number of sentences (e.g., the sentence count) in the audio file. In operation, estimating the sentence count may include (i) converting the audio file into a text file with a known speech-to-text conversion algorithm and counting the sentences in the text file and/or (ii) analyzing the audio file's waveform and counting the sentences based on the portions of silence between sentences in the time domain waveform as described herein with reference to FIG. 2.

Block 331 includes comparing the sentence count of the audio file estimated at block 330 with the actual sentence count (i.e., number of sentences) in the text of the audio file's corresponding text-based news story. Block 331 also includes determining a sentence count delta, which corresponds to the percentage difference between the audio file's estimated sentence count determined in block 330 and the actual sentence count of the audio file's corresponding text-based news story.

Block 332 includes determining whether the sentence count delta is less than or equal to a sentence count approval threshold. For example, if the word count approval threshold is +/−5%, and if the word count delta determined at block 327 is −4% (i.e., the number of sentences estimated in the audio file is less than the actual number of sentences in the audio file's corresponding text-based news story by 4%), then the sentence count delta (i.e., −4%) would be less than or equal to the sentence count approval threshold (i.e., +/−5%). In such an instance, the algorithm 325 approves the audio file for distribution at block 323.

But if at block 332, the algorithm 325 determines that the sentence count delta is greater than the sentence count approval threshold, then algorithm 325 proceeds to block 333, which includes determining whether the sentence count delta is greater than or equal to a sentence count rejection threshold. If the sentence count delta is greater than or equal to the sentence count rejection threshold, then the algorithm 325 rejects the audio file at block 310. But if the sentence count delta is less than the sentence match rejection threshold, then the algorithm 325 will designate the audio file for review by a human at block 324.

FIG. 3D shows algorithm 335 for assessing the accuracy of an audio file by determining whether and the extent to which the actual duration of an audio file exceeds an expected duration of the audio file.

Block 336 includes estimating the duration of the audio file. In some embodiments, the algorithm 335 estimates the duration of the audio file by multiplying the number of words in the text of the audio file's corresponding text-based news story with a target words-per-minute audio pace. For example, if the audio file's corresponding text-based news article includes 554 words, and the target pace is 155 words-per-minute, then the audio file's estimated duration would be 3.57 minutes.

At block 337, algorithm 335 includes determining the actual duration of the audio file. Typically, the actual duration of the audio file is contained in metadata associated with the audio file. If not, then the actual duration of the audio file can be obtained by simple inspection.

Block 338 includes determining a duration delta, which corresponds to the percentage difference between the audio file's estimated duration determined at block 336 and the audio file's actual duration determined at block 337.

Block 339 includes determining whether the duration delta is less than or equal to a duration delta approval threshold. For example, if the duration delta approval threshold is +/−5%, and if the duration delta determined at block 338 is 1% (i.e., the actual duration of the audio file is 1% longer than the estimated duration) then the duration delta (i.e., 1%) would be less than or equal to the duration delta approval threshold (i.e., +1-5%). In such an instance, the algorithm 335 approves the audio file for distribution at block 323.

But if at block 339, the algorithm 335 determines that the duration delta is greater than the duration delta approval threshold, then algorithm 335 proceeds to block 340, which includes determining whether the duration delta is greater than or equal to a duration delta rejection threshold. If the duration delta is greater than or equal to the duration delta rejection threshold, then the algorithm 335 rejects the audio file at block 310. But if the duration delta is less than the duration delta rejection threshold, then the algorithm 335 will designate the audio file for review by a human at block 324.

FIG. 3E shows algorithm 341 for assessing the accuracy of an audio file by determining whether and the extent to which the pace (words-per-minute) of the audio file exceeds a target pace.

Block 342 includes determining the number of words in audio file's corresponding text-based news story. Next, algorithm 341 determines the actual duration of the audio file at block 343. Then, at block 344, algorithm 341 estimates the pace (i.e., the words-per-minute rate) of the audio file by dividing the number of words in the audio file's corresponding text-based news story (from block 342) by the actual duration of the audio file (from block 343).

At block 345, algorithm 341 includes determining a pace delta, which corresponds to the percentage difference between the audio file's pace determined at block 334 and a target pace. For example, if the audio file's corresponding text-based news story includes 953 words, and the actual duration of the audio file is 6.25 minutes, then the pace would be 152.5 words-per-minute. And if the target pace is 155 words-per-minute, then the pace delta would be −1.6% (i.e., the audio pace is 1.6% slower than the target audio pace).

Block 346 includes determining whether the pace delta is less than or equal to a pace delta approval threshold. For example, if the pace delta approval threshold is +/−5%, and if the pace delta determined at block 345 is −1.6% (i.e., the actual pace of the audio file is −1.6% slower than the target pace) then the pace delta (i.e., −1.6%) would be less than or equal to the pace delta approval threshold (i.e., +/−5%). In such an instance, the algorithm 341 approves the audio file for distribution at block 323.

But if at block 346, the algorithm 341 determines that the pace delta is greater than the pace delta approval threshold, then algorithm 341 proceeds to block 347, which includes determining whether the pace delta is greater than or equal to a pace delta rejection threshold. If the pace delta is greater than or equal to the pace delta rejection threshold, then the algorithm 341 rejects the audio file at block 310. But if the pace delta is less than the pace delta rejection threshold, then the algorithm 341 will designate the audio file for review by a human at block 324.

While particular aspects and embodiments are disclosed herein, other aspects and embodiments will be apparent to those skilled in the art in view of the foregoing teaching. For example, while the embodiments are described with respect to applications for text-based news stories, the disclosed systems and methods are not so limited. The various aspects and embodiments disclosed herein are for illustration purposes only and are not intended to be limiting, with the true scope and spirit being indicated by the following claims.

The invention claimed is:

1. A method performed by a computing system, the method comprising:
   receiving a plurality of audio files from a plurality of audio file creators, wherein an individual audio file of the plurality of audio files comprises an audible version of a corresponding text-based news story;
   storing the plurality of received audio files in a tangible, non-transitory computer readable media;
   determining whether the individual audio file is acceptable for distribution to a plurality of subscribers for playback based on a computer analysis of the individual audio file, wherein determining whether the individual audio file is acceptable for distribution to a plurality of subscribers for playback based on a computer analysis of the individual audio file comprises determining whether an average volume of the individual audio file is (i) less than or equal to a maximum average volume threshold and (ii) greater than or equal to a minimum average volume threshold;
   in response to determining that the individual audio file is acceptable for distribution, approving the individual audio file for distribution;
   in response to determining that the individual audio file is not acceptable for distribution, determining whether the individual audio file that is not acceptable for distribution can be remediated;
   in response to determining that the individual audio file that is not acceptable for distribution can be remediated, remediating the individual audio file that is not acceptable for distribution;
   in response to determining that the individual audio file that is not acceptable for distribution cannot be remediated, determining whether the individual file that is not acceptable for distribution is not so flawed as to require rejection and should be reviewed by a human;
   in response to determining that the individual audio file that is not acceptable for distribution but not so flawed as to require rejection should be reviewed by a human, designating the individual audio file for review by a human;
   in response to determining that the individual audio file that is not acceptable for distribution and cannot be remediated should not be reviewed by a human, rejecting the individual audio file that is not acceptable for distribution and cannot be remediated; and
   wherein the computing system is configured to perform at least all three actions of rejecting individual audio files, remediating individual audio files, and designating individual audio files for review by a human.

2. The method of claim 1, wherein determining whether the individual audio file is acceptable for distribution to a plurality of subscribers for playback based on a computer analysis of the individual audio file comprises:
   generating a text file from the individual audio file; for each word in the individual audio file's corresponding text-based news story,
   determining whether the word matches its corresponding word in the generated text file; and determining whether a number of words in the individual audio file matching corresponding words in the individual audio file's corresponding text-based news story is greater than or equal to a word match threshold.

3. The method of claim 1, wherein determining whether the individual audio file is acceptable for distribution to a plurality of subscribers for playback based on a computer analysis of the individual audio file comprises:
   determining a number of words in the individual audio file's corresponding text-based news story;
   determining a duration of the individual audio file;
   estimating a number of words in the individual audio file based on the determined duration and an estimated words-per-minute rate of the individual audio file; and
   determining whether a difference between the determined number of words in the individual audio file's corresponding text-based news story and the estimated number of words in the individual audio file is less than or equal to a word count threshold.

4. The method of claim 1, wherein determining whether the individual audio file is acceptable for distribution to a plurality of subscribers for playback based on a computer analysis of the individual audio file comprises:
   determining a number of sentences in the individual audio file's corresponding text-based news story;
   estimating a number of sentences in the individual audio file based at least in part on an analysis of an audio waveform corresponding to the individual audio file; and
   determining whether a difference between the determined number of sentences in the individual audio file's corresponding text-based news story and the estimated number of sentences in the individual audio file is less than or equal to a sentence count threshold.

5. The method of claim 1, wherein determining whether the individual audio file is acceptable for distribution to a plurality of subscribers for playback based on a computer analysis of the individual audio file comprises:
   estimating a duration of the audio file based on a number of words in the audio file's corresponding text-based news story and a target audio pace;
   determining an actual duration of the audio file; and
   determining whether a difference between the estimated duration and the actual duration is less than or equal to a duration threshold.

6. The method of claim 1, wherein determining whether the individual audio file is acceptable for distribution to a plurality of subscribers for playback based on a computer analysis of the individual audio file comprises:
   determining a number of words in the individual audio file's corresponding text-based news story;
   determining a duration of the individual audio file;
   calculating a words-per-minute audio pace of the individual audio file by dividing the determined number of words in the individual audio file's corresponding text-based news story by the determined duration of the individual audio file; and
   determining whether the calculated words-per-minute audio pace is both (i) less than or equal to a maximum audio pace threshold and (ii) greater than or equal to a minimum audio pace threshold.

7. The method of claim 1, wherein determining whether the individual audio file is acceptable for distribution to a plurality of subscribers for playback based on a computer analysis of the individual audio file comprises:
   determining whether background noise in the individual audio file is less than or equal to a background noise threshold.

8. The method of claim 7, further comprising: in response to determining whether background noise in the individual audio file is not less than or equal to a background noise threshold, generating a noise-reduced version of the audio file by applying one or more noise reduction algorithms to the audio file; and
   determining whether background noise in the noise-reduced version of the audio file is less than or equal to a background noise threshold.

9. The method of claim 1, wherein the audio file has a dynamic range, and wherein the method further comprises:
   generating a compressed audio file by compressing the dynamic range of the individual audio file in response to determining that the average volume of the individual audio file is neither (i) less than or equal to a maximum average volume threshold nor (ii) greater than or equal to a minimum average volume threshold; and
   determining whether an average volume of the dynamic range of the compressed audio file is (i) less than or equal to a maximum average volume threshold and (ii) greater than or equal to a minimum average volume threshold.

10. The method of claim 1, wherein determining whether the individual audio file is acceptable for distribution to a plurality of subscribers for playback based on a computer analysis of the individual audio file comprises:
    determining whether a peak volume of the individual audio file is less than or equal to a peak volume threshold.

11. The method of claim 10, further comprising:
    in response to determining that the peak volume of the individual audio file is less than or equal to the peak volume threshold, generating a processed version of the individual audio file by applying at least one of a limiter function or a dynamic range compression function to the individual audio file; and
    determining whether a peak volume of the processed version of the audio file is less than or equal to the peak volume threshold.

12. The method of claim 1, wherein remediating the individual audio file comprises one or more of (i) applying a noise reduction algorithm to the individual audio file, (ii) applying a dynamic range compression algorithm to the individual audio file, and/or (iii) applying a limiting function to the individual audio file.

13. The method of claim 1, wherein rejecting the individual audio file comprises transmitting an indication to an audio file creator associated with the individual audio file, the indication comprising one or more of: (i) a notification that the individual audio file has been rejected, (ii) at least one reason for rejecting the audio file, and (iii) a request that the audio file creator resend a corrected version of the individual audio file.

14. A system comprising:
    one or more processors; and
    tangible, non-transitory, computer-readable memory having instructions stored therein, wherein the instructions, when executed by the one or more processors, cause the system to perform a method comprising:
    receiving a plurality of audio files from a plurality of audio file creators, wherein an individual audio file of the plurality of audio files comprises an audible version of a corresponding text-based news story;
    storing the plurality of received audio files in a tangible, non-transitory computer readable media;

analyzing one or more accuracy metrics or one or more quality metrics of an individual audio file against one or more corresponding accuracy thresholds, and based on the analysis of the one or more accuracy or quality metrics, determining whether the individual audio file is acceptable for distribution to a plurality of subscribers for playback based on a computer analysis of the individual audio file, wherein determining whether the individual audio file is acceptable for distribution to a plurality of subscribers for playback based on a computer analysis of the individual audio file comprises determining whether an average volume of the individual audio file is (i) less than or equal to a maximum average volume threshold and (ii) greater than or equal to a minimum average volume threshold;

in response to determining that the individual audio file is acceptable for distribution, approving the individual audio file for distribution; and in response to determining that the individual audio file is not acceptable for distribution, determining whether the individual audio file can be remediated;

in response to determining that the individual audio file that is not acceptable for distribution can be remediated, remediating the individual audio file that is not acceptable for distribution;

in response to determining that the individual audio file that is not acceptable for distribution cannot be remediated, determining whether the individual file that is not acceptable for distribution is not so flawed as to require rejection should be reviewed by a human;

in response to determining that the individual audio file that is not acceptable for distribution but not so flawed as to require rejection should be reviewed by a human, designating the individual audio file for review by a human;

in response to determining that the individual audio file that is not acceptable for distribution and cannot be remediated should not be reviewed by a human, rejecting the individual audio file that is not acceptable for distribution and cannot be remediated; and wherein the system is configured to perform at least all three actions of rejecting individual audio files, remediating individual audio files, and designating individual audio files for review by a human.

15. The system of claim 14, wherein the one or more accuracy metrics comprise one or more of:
 a word match metric based on a number of words in a speech-to-text version of the individual audio file that match corresponding words in the individual audio file's corresponding text-based news story;
 a word count metric based on a difference between (i) a number of words in the individual audio file's corresponding text-based news story and (ii) an estimated number of words in the individual audio file;
 a sentence count metric based on a difference between (i) a number of sentences in the individual audio file's corresponding text-based news story and (ii) an estimated number of sentences in the individual audio file;
 a duration metric based on a difference between (i) an actual duration of the individual audio file and (ii) an estimated duration of the audio file, wherein the estimated duration is based on a number of words in the audio file's corresponding text-based news story and a target audio pace; and
 an audio pace metric based on a difference between (i) a target audio pace and (ii) a calculated audio pace for the individual audio file, wherein the calculated audio pace is based on the number of words in the individual audio file's corresponding text-based news story and the actual duration of the individual audio file.

16. The system of claim 14, wherein the one of more quality measures comprise one or more of:
 a background noise metric based whether background noise measured in the individual audio file exceeds a background noise threshold; and
 a peak volume metric based on whether a peak volume of the individual audio file is less than or equal to a peak volume threshold.

17. The system of claim 16, wherein the method further comprises:
 applying a noise reduction algorithm to the individual audio file in response to determining that the individual audio file exceeds the background noise threshold;
 applying a dynamic range compression algorithm to the individual audio file in response to determining that the individual audio file is neither (a) less than or equal to the maximum average volume threshold nor (b) greater than or equal to the minimum average volume threshold; and
 applying a limiting function to the individual audio file in response to determining that the individual audio file exceeds the peak volume threshold.

18. A tangible, non-transitory computer readable media comprising instructions executable by one or more processors, wherein the instructions, when executed by the one or more processors, cause the one or more processors to perform functions comprising:
 receiving a plurality of audio files from a plurality of audio file creators, wherein each audio file comprises an audible version of a corresponding text-based news story;
 storing the plurality of received audio files in a tangible, non-transitory computer readable media;
 determining whether an individual audio file in the plurality of audio files is acceptable for distribution to a plurality of subscribers for playback based on a computer analysis of the individual audio file, wherein determining whether the individual audio file is acceptable for distribution to a plurality of subscribers for playback based on a computer analysis of the individual audio file comprises determining whether an average volume of the individual audio file is (i) less than or equal to a maximum average volume threshold and (ii) greater than or equal to a minimum average volume threshold;
 in response to determining that the individual audio file of the plurality of audio files is acceptable for distribution, approving the individual audio file for distribution;
 in response to determining that the individual audio file is not acceptable for distribution, determining whether the individual audio file that is not acceptable for distribution can be remediated;
 in response to determining that the individual audio file that is not acceptable for distribution can be remediated, remediating the individual audio file that is not acceptable for distribution;
 in response to determining that the individual audio file that is not acceptable for distribution cannot be remediated, determining whether the individual file that is not acceptable for distribution is not so flawed as to require rejection and should be reviewed by a human;
 in response to determining that the individual audio file that is not acceptable for distribution but also not so flawed as to require rejection should be reviewed by a human, designating the individual audio file for review by a human;

in response to determining that the individual audio file that is not acceptable for distribution and cannot be remediated should not be reviewed by a human, rejecting the individual audio file that is not acceptable for distribution and cannot be remediated; and wherein the tangible, non-transitory computer-readable media comprises instructions executable by the one or more processors for performing at least all three actions of rejecting individual audio files, remediating individual audio files, and designating individual audio files for review by a human.

\* \* \* \* \*